United States Patent
Reineke et al.

(12) 
(10) Patent No.: US 12,407,727 B2
(45) Date of Patent: Sep. 2, 2025

(54) AI ETHICS SCORES IN AUTOMATED ORCHESTRATION DECISION-MAKING

(71) Applicant: Dell Products L.P., Round Rock, TX (US)

(72) Inventors: Nicole Reineke, Northborough, MA (US); Stephen J. Todd, North Andover, MA (US)

(73) Assignee: Dell Products L.P., Round Rock, TX (US)

( * ) Notice: Subject to any disclaimer, the term of this patent is extended or adjusted under 35 U.S.C. 154(b) by 204 days.

(21) Appl. No.: 17/648,410

(22) Filed: Jan. 19, 2022

(65) Prior Publication Data
US 2023/0231883 A1    Jul. 20, 2023

(51) Int. Cl.
*H04L 9/40* (2022.01)
*G06F 9/50* (2006.01)

(52) U.S. Cl.
CPC .............. *H04L 63/20* (2013.01); *G06F 9/505* (2013.01); *G06F 9/5072* (2013.01)

(58) Field of Classification Search
CPC ......... H04L 63/20; G06F 9/505; G06F 9/5072
See application file for complete search history.

(56) References Cited

U.S. PATENT DOCUMENTS

| | | | |
|---|---|---|---|
| 2009/0070771 A1* | 3/2009 | Yuyitung | G06Q 10/06 713/323 |
| 2019/0311277 A1 | 10/2019 | Kursun et al. | |
| 2020/0028935 A1* | 1/2020 | Sahay | G06F 9/5088 |
| 2021/0299576 A1 | 9/2021 | Donovan | |
| 2022/0164242 A1* | 5/2022 | Sui | G06F 9/505 |
| 2022/0237477 A1 | 7/2022 | Tamilselvam et al. | |
| 2023/0229940 A1 | 7/2023 | Reineke et al. | |
| 2024/0195701 A1 | 6/2024 | Subramanya et al. | |

OTHER PUBLICATIONS

Nevanpera, Minna. "Aspects to responsible artificial intelligence: ethics of artificial intelligence and ethical guidelines in Shapes Project." (2021). (Year: 2021).

* cited by examiner

*Primary Examiner* — Farid Homayounmehr
*Assistant Examiner* — Brian William Avery
(74) *Attorney, Agent, or Firm* — Workman Nydegger (57) ABSTRACT

One example method includes receiving an orchestration automation request for an asset, identifying an ethics rule that applies to the asset, comparing the ethics rule to asset values contained in an AI ethics datastore, based on the comparing, identifying a list of assets that conform to the ethics rule, and when the asset appears in the list of assets that conform to the ethics rule, automatically placing the asset at an entity of a computing infrastructure.

18 Claims, 4 Drawing Sheets

FIG. 1

AI Ethics Datastore Example Architecture

AI Ethics Datastore

201 — Asset Historian (AssetID, AssetOverallTally(arrayOfTalliesOverTime), FKContributor, FKOrg, FKAccessHistorian,...)

| | Context (Arrays, tags) | Self-measurement | Machine assertion | Peer assessment | Tally |
| --- | --- | --- | --- | --- | --- |
| Accountability | ContextX.X | Self-measurement | Machine assertion | Peer assessment | Tally |
| | Context (Arrays, tags) | Self-measurement | Machine assertion | Peer assessment | Tally |
| Value Alignment | ContextX.X | Self-measurement | Machine assertion | Peer assessment | Tally |
| | Context (Arrays, tags) | Self-measurement | Machine assertion | Peer assessment | Tally |
| Explainability | ContextX.X | Self-measurement | Machine assertion | Peer assessment | Tally |
| | Context (Arrays, tags) | Self-measurement | Machine assertion | Peer assessment | Tally |
| Fairness | ContextX.X | Self-measurement | Machine assertion | Peer assessment | Tally |
| | Context (Arrays, tags) | Self-measurement | Machine assertion | Peer assessment | Tally |
| User Data Rights | Contextx.X | Self-measurement | Machine assertion | Peer assessment | Tally |

{ 202 }

Contributor Historian (FKOrgs, Assets, Peer, Access)

Organization (Tags, Industry, Geo, Context min settings, Arrays [FKContributors, FKAssets, ScoresOverTime])

Peer Historian (UserName, FKContributor(ifapplicable), voteHistory, FKOrg, tags, Geo, Array(other data tags))

204 — Access Historian (AssetFK, ViewRecord, AccessRecords, Array(other data))

AI Ethics Automation Rules(Array)

RuleOrg (PKRuleOrg, FKContributorOrg, FKSecurityRules(if applicable LDAP or other secondary source pointers), orgType, Array(tags))

Rule (PKRule, FKOrg, FKContributor(if applicable), RuleType, Array(decisionTree/manifest/instructions),tags)

Historian (RuleFK, InvokeReason, OutPutRecord, DecisionRecord, Array(other data))

AI ETHICS SCORES IN AUTOMATED ORCHESTRATION DECISION-MAKING

FIELD OF THE INVENTION

Embodiments of the present invention generally relate to orchestration in IT (information technology) environments. More particularly, at least some embodiments of the invention relate to systems, hardware, software, computer-readable media, and methods for the use of AI (artificial intelligence) ethics scores to reduce the risk executing unethical algorithms as a result of automated decision-making.

BACKGROUND

Automated orchestration of IT environments is a critical part of any company's digital strategy. One benefit of automated orchestration is that the orchestration algorithms can quickly make placement decisions, such as for algorithms for example, and reap the benefits of business agility. There is no need for a human being to get involved and slow the process down.

However, the choices made by automation may inadvertently lead to unethical system behavior. Particularly, there are cases where the placement of workloads by an automated orchestration algorithm can result in ethical ambiguity or violations. Workload placement in these circumstances may expose a corporation to large fines, particularly since infrastructure automation often leaves a bread crumb trail of its decisions, which provides evidence of unethical deployment. Thus, the problems associated with ethical deployment of algorithms and data puts companies at a disadvantage.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to orchestration in IT environments. More particularly, at least some embodiments of the invention relate to systems, hardware, software, computer-readable media, and methods for the use of AI ethics scores to reduce the risk executing unethical algorithms as a result of automated decision-making.

In general, example embodiments of the invention embrace, among other things, methods and systems for use by organizations in establishing their AI Ethics metrics against various types of assets such as, algorithms, physical equipment, and logical locations, and for establishing AI ethics automation rules to make real-time orchestration decisions using measures of ethics to determine which, if any, assets will be utilized in certain circumstances, based on minimum standards or matching ethics requirements.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that an embodiment may operate to place a workload, or omit placing a workload, based on ethical considerations relating to the performance of that workload. An embodiment may enable an organization to provide an audit trail demonstrating compliance with company, and/or other, ethical standards, when placing a workload in a computing environment. An embodiment may notify an organization when a workload placement that while optimal, is non-compliant with applicable ethical standards. An embodiment may operate to employ the ethically compliant asset that is most optimal as among a group of ethically compliant assets. An embodiment may operate to place the ethically compliant workload that is most optimal as among a group of ethically compliant workloads. Various other advantages of example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Overview

Embodiments of the invention may be implemented in any computing environment, which may also be referred to herein as 'computing infrastructure' or simply 'infrastructure.' Such a computing environment may comprise, by way of illustration and not limitation, various computing entities that comprise hardware and/or software, such as servers, clients, applications and algorithms, communication networks, and data storage systems and devices. Entities comprising hardware and/or software may be referred to herein as 'assets.' The computing environment may be configured to include on-premises sites, and remote sites such as cloud computing sites and cloud storage sites, as well as edge devices, networks, and sites, all configured to communicate with each other. Various operations involving the infrastructure may be automated in the interest of efficiency, accuracy, and time/cost savings, for example.

Consider the following examples of infrastructure automation:

An existing workload begins exceeding the currently-deployed infrastructure capabilities and wishes to run an algorithm that recommends a new/different place to run that workload.

A new workload is ready to run, and an automation algorithm chooses a cloud location from a list of multiple available cloud candidates.

A new, highly-sensitive workload, related to an order information service, wishes to run in a cloud provider. This workload does not handle any personal data.

A benefit of infrastructure automation is that the algorithms can quickly make workload placement decisions and reap the benefits of business agility. There is no need for a human being to get involved and slow the process down.

As noted earlier herein however, there are cases where the placement of workloads can result in ethical ambiguity or violations. Problems associated with ethical deployment of algorithms and data puts companies at a disadvantage. Following is a discussion of some examples of problems that could occur in such circumstances, and which some example embodiments may avoid or resolve.

Figure 1:
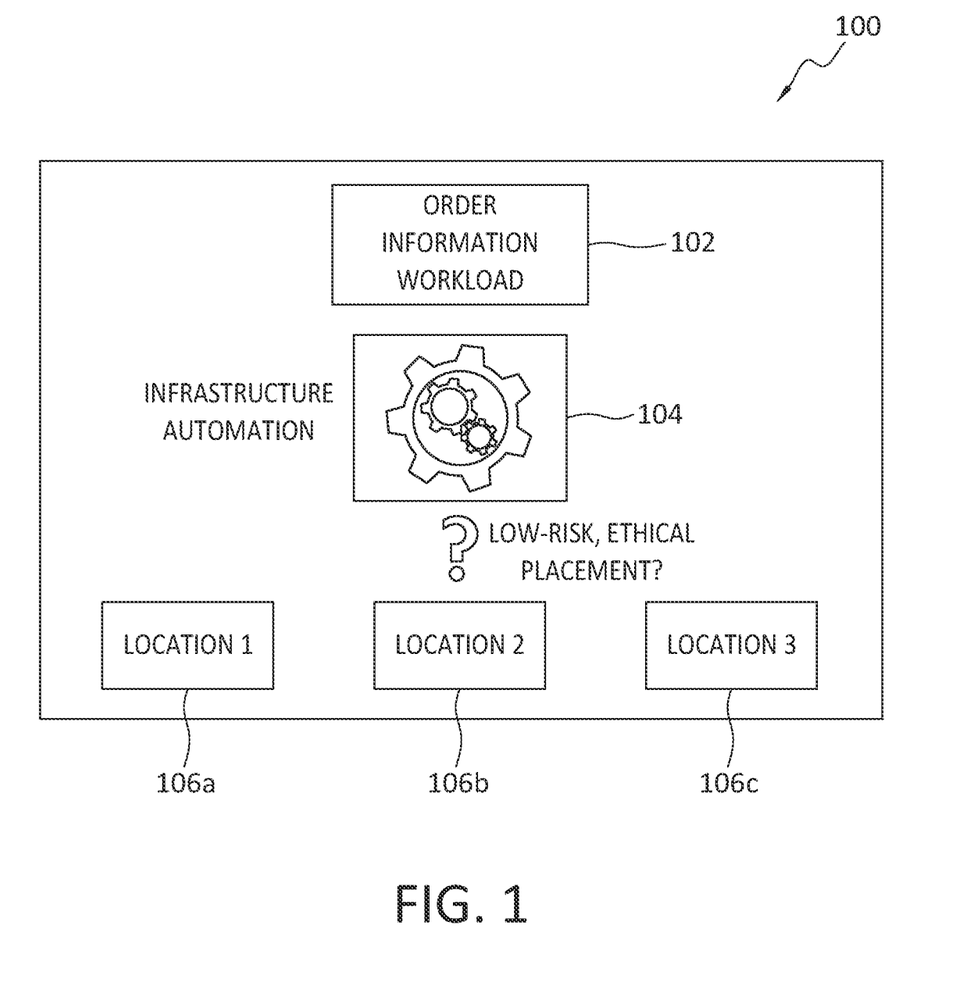
FIG. 1 discloses an example operating environment for an embodiment of the invention.

With attention now to the illustrative example of FIG. 1, an example infrastructure 100 is disclosed in which an infrastructure automation dilemma is presented. Particularly, an order information service 102 wishes to run an order information workload in a cost-effective environment, and in an ethical manner. An automation framework 104 has several placement choices for the order information workload associated with the order information service 102, namely, locations 106a, 106b, and 106c, but struggles to determine an ethical placement choice for the workload. That is, the automation framework 104 is unable to determine, among the locations 106a, 106, and 106, which could be cloud providers, co-lo locations, or different hardware configurations within a data center, whether placement of the workload at any of those locations would meet ethical standards, such as in terms of the performance of the workload, and in terms of any outcomes of that performance. The ethical risks associated with the placement of workloads or data by infrastructure automation algorithms is an issue as yet unaddressed, and unresolved, in the industry.

To illustrate, does a workload, such as the illustrative workload of FIG. 1, require the handling of personal data? If so, then the infrastructure automation software 104 may be constrained to place that workload only at locations that guarantee the ethical handling of personal data. If the handling of personal data is not required by the workload, then the infrastructure automation software can make different decisions related to ethics. As discussed below then, infrastructure automation, workload automation, and ethical considerations, may pose, or at least implicate, a variety of problems.

One such problem concerns the lack of Ethics-Level-Agreements (ELA) for workloads. While workloads can come packaged with SLAs (Service Level Agreements) regarding performance and perhaps even security requirements, ELAs are not currently provided with workloads. If they were, then infrastructure automation software would have access to additional context about the "values" of the workload. For example, does the workload implicate privacy issues, transparency issues, fairness issues? In example embodiments of the invention, the existence of such issues may be determined by automation software that has access to a values context for the workload.

Another such problem concerns the lack of a listing of infrastructure ethical capabilities. For example, new products are emerging in the industry that provide different levels of ethical support. For example, a server analytics framework may have built-in explainability for any algorithm that produces insights, which increases the transparency of the algorithms. A streaming data service in a storage system may preserve privacy by performing all data analysis within the context of a secure enclave, which may protect consumer rights. Unfortunately, there is no way to query these infrastructure components and receive a list of their ethical capabilities.

Further, the conventional technology fails to provide for ethical mapping/orchestration of workloads to infrastructure. Particularly, infrastructure automation and orchestration is currently unaware of (a) workload ethical needs, and (b) infrastructure ethical capabilities. As such, there is currently no support for infrastructure automation software making placement decisions that consider (a) and perform placement based on (b).

Not only is there presently a lack of ethical automation and orchestration of workload placement, but there is also a lack of a mechanism for human call-outs for ethical dilemmas. For example, there may be scenarios in which the automation software is unable to discern which placement decision is the best. Currently however, there exists no framework for notifying and involving a human being to enlist their help in making the placement decision.

As well, there is currently no provision for ethical audit trails in the context of workload placement. Particularly, current audit logs contain a significant amount of detailed information regarding why infrastructure automation software made certain placement decisions. However, these audit logs lack any ability to describe the role of ethics in automated placement decisions.

Finally, while regulations such as the GDPR (General Data Protection Regulation, in European Union law) place restrictions on the handling of personal data and information, the GDPR and other regulations fail to define the extension of data usage in an explainable way, and likewise fail to consider the specific context in which, for example, personal data can or cannot be accessed and used. Further, regulations such as the GDPR fail to address matters such as hardware sourcing and placing in a way that is context sensitive. In contrast, example embodiments may provide, at least the aforementioned functionalities that are absent from conventional approaches, such as those that are based on regulations such as the GDPR.

Some example embodiments may resolve any, and all, of the aforementioned problems. However, no embodiment is required to implement a solution to, nor address, any particular problem.

B. Detailed Aspects of Some Example Embodiments of the Invention

Note that U.S. patent application, Ser. No. 17/648,066, entitled AI ETHICS DATA STORES AND SCORING MECHANISMS, filed 14 Jan. 22 (the "'066 Application") discloses, among other things, the creation and recording of context for AI ethics, and an AI Ethics Datastore Architecture. The '066 Application is incorporated herein in its entirety by this reference.

Example embodiments of the present invention are directed to a method and system for organizations to establish their AI ethics metrics against assets, such as algorithms, physical computing entities, and logical locations, and establish AI ethics automation rules to make real-time orchestration decisions using measures of ethics to determine which, if any, algorithms to utilize based on minimum standards or matching ethics requirements.

Figure 2:
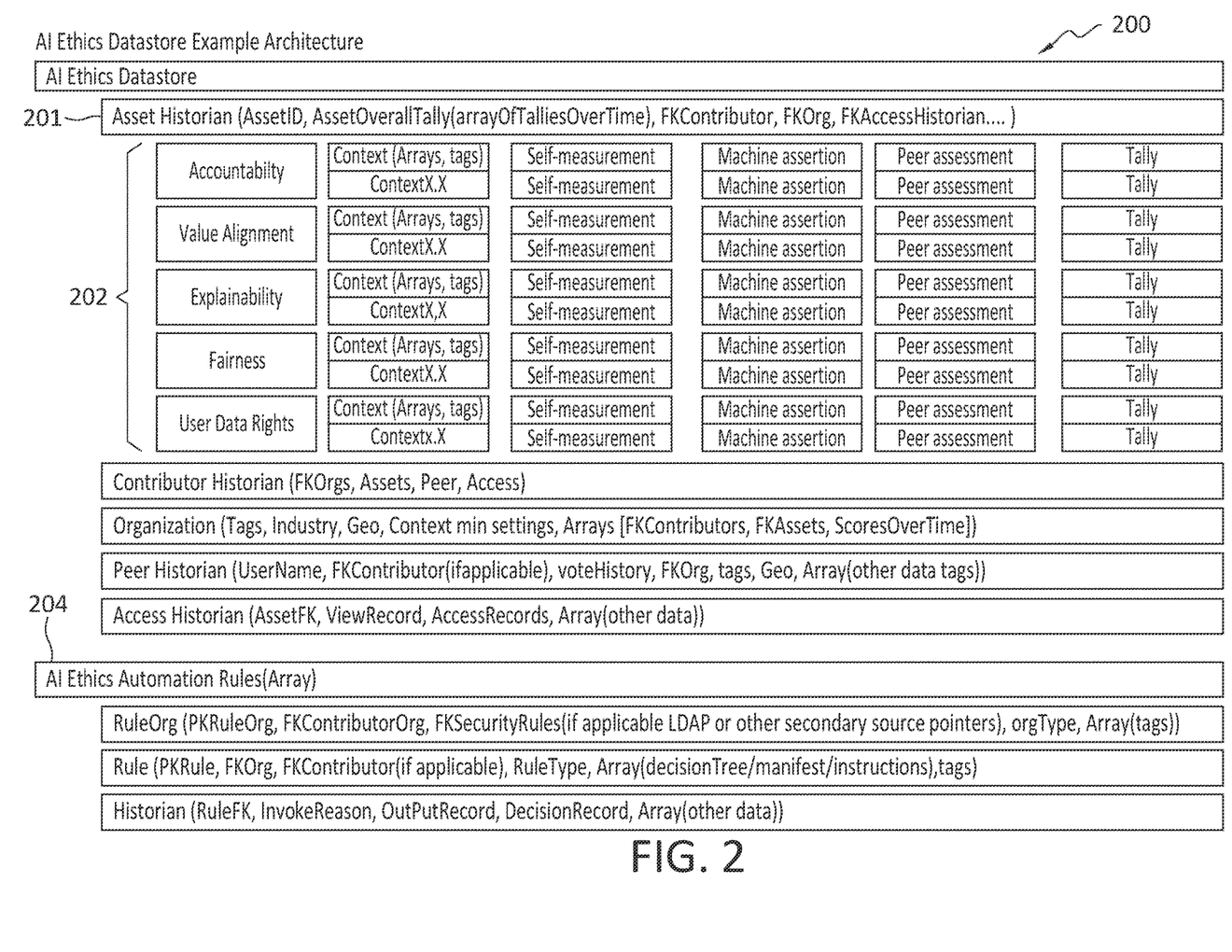
FIG. 2 discloses aspects of an AI ethics datastore architecture that includes ethics automation rules.

With reference now to FIG. 2, there is disclosed an example AI ethics datastore architecture 200, expanded from the example AI Ethics Datastore Architecture disclosed in the '066 Application to enable AI ethics orchestration automation. That is, except as noted in FIG. 2 and the associated discussion herein, the AI ethics datastore architecture 200 may be similar, or identical, to an AI ethics datastore architecture as disclosed in the '066 Application. Note that as used in FIG. 2, 'FK' refers to a Foreign Key, while 'FK Org' and 'FKOrg' refer to a foreign key referencing the Primary Key (PK) identifier in the organization table.

As disclosed in FIG. 2, the AI ethics datastore architecture 200 may maintain a list 201 of all provider assets, which may be, for example, physical, virtual, software, data sets, and algorithms. The assets each contain an accounting of their baseline ethical context as defined in connection with five major pillars 202, and possibly additional pillars as well. These pillars 202 include, but are not limited to, 'Accountability,' 'Value Alignment,' 'Explainability,' 'Fairness,' and 'User Data rights.' For each of these assets and context versions, there may be provided an accounting of the efforts of the creator of the asset to comply with the context, the measurement of the compliance by a third party or machine, and a peer attestation or review of the compliance efforts made by the creator with respect to the stated context. A "score" may be established against each pillar and across all pillars per asset.

Example embodiments may extend these concepts further to capture not just the asset 'provider' attestation of asset needs, but also to establish the consumer, such as a person, company, organization, or other entity using the asset, attestation of consumption rules 204 against assets. This may be achieved through the use of tags or labels where a consumer may select, from a set of known ethics values per pillar, a minimum AI ethics tally, and/or other AI ethics labels and behaviors. In this way, a consumer who may potentially consume, employ, or place, an asset, can specify ethical criteria and standards that must be met before the consumer will use, consume, place, or employ, the asset. These tags, labels, and other information selected/specified by a consumer may serve as inputs to infrastructure automation software, an example of which is discussed in connection with FIG. 1, to guide that software in the placement of workloads, for example. That is, and as discussed below, the rules 204 and related information, data, and metadata, may be taken into consideration in the workflow for orchestration.

Figure 3:
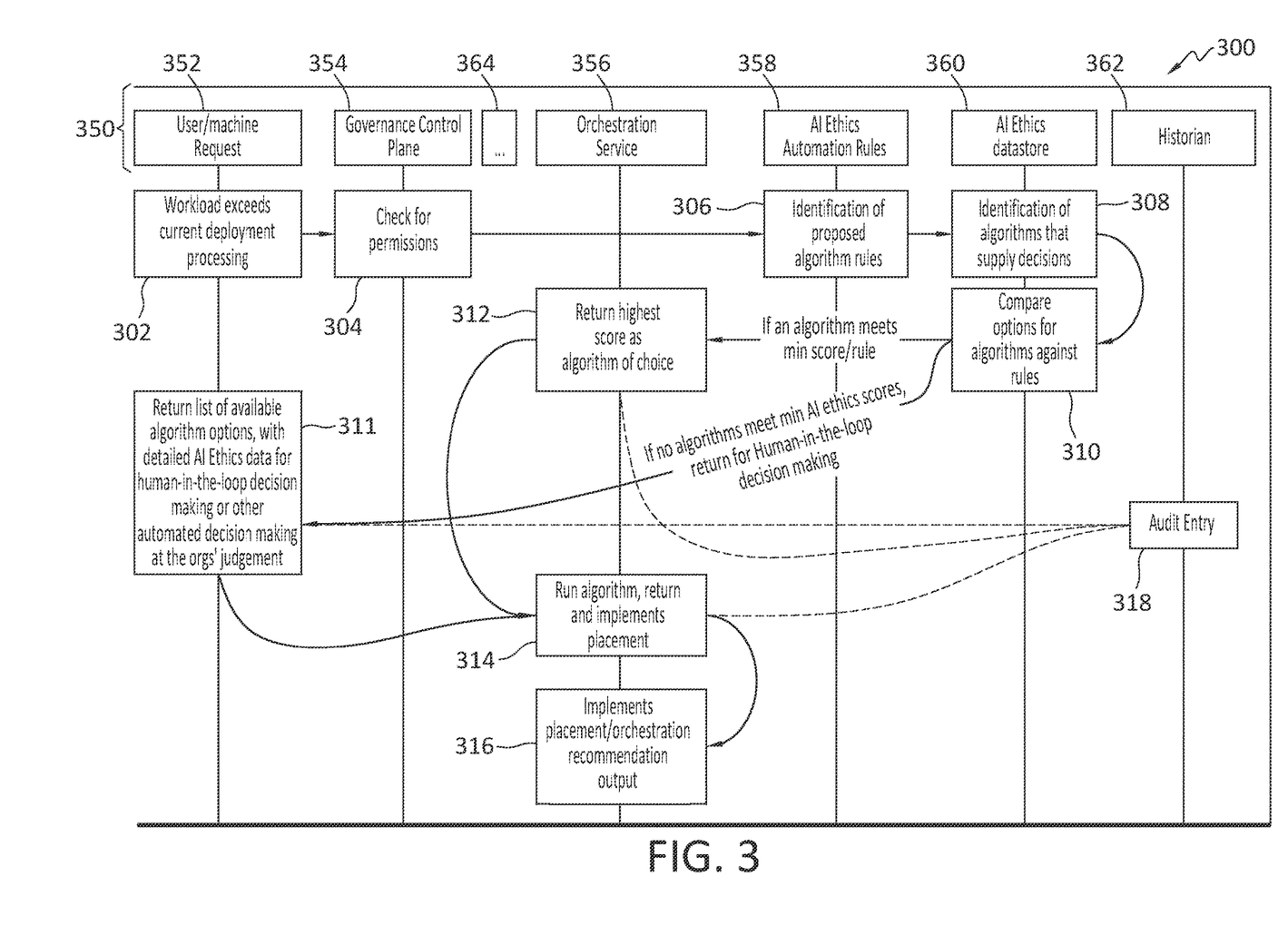
FIG. 3 discloses an example automated orchestration process according to an example embodiment.

With continued reference to FIG. 2, and directing attention now to FIG. 3 as well, there is disclosed an orchestration workflow, or method 300, that utilizes H measures of AI ethics to determine real time orchestration decisions. As shown, the method 300 may be implemented in an infrastructure 350 that includes a variety of elements such as, but not limited to, an interface 352 for user machine requests, a governance control plane 354, an orchestration service 356, a module 358 including AI ethics automation rules, an AI ethics datastore 360, a historian 362, and various other entities 364. The method 300 may be implemented by cooperation of an AI ethics datastore and a workload orchestration platform, although no particular implementation is required by any embodiment of the invention.

The example method 300 may begin when a standard orchestration automation request is initiated 302 by a manual or software request. The typical workflow for a request is routed through the governance/security control plane 304 to check for permissions, that is, to check if the requestor is authorized to have the request 302 fulfilled. In some instances, if the permissions check at 304 is passed, the request may be sent on to the orchestration service 356 for placement of a workload or asset.

However, in the example method 300, the request may be routed to the AI ethics automation rules datastore to access 306 the automation rules that relate to the deployment or orchestration request. To illustrate, in one example, an entity may be deploying a customer-data containing database, and have minimum asset overall AI ethics tallies of 80% or higher, with data pillar of 100%. In another example, an entity may have an indicator that storage is low and requires an expansion algorithm and the AI ethics tally requirements for the expansion algorithm are fairness of 100% and explainability is above 80%.

Next, the automation rules may be compared 308 to the AI ethics datastore assets values, and a list of assets identified. If automation identifies 312, based on a comparison 310, that an asset such as an algorithm meets the applicable ethical requirements, then the orchestration algorithm may be run 314 and the identified asset automatically placed 316 by the orchestration algorithm. In this case, an audit entry may be made and the asset employed. If the comparison 310 reveals that no assets meet the minimum requirements, an ordered list of assets and their values may be returned 311 to the system for secondary decision making, which may include human-in-the-loop intervention, after which the orchestration algorithm may be run 314 to place an asset according to the secondary decision making process. Audit records of decisions to employ, or not, a particular asset may be kept 318 for future use and learning.

C. Further Discussion

As will be apparent from this disclosure, example embodiments may possess various useful features. For example, embodiments may define and employ Ethics-Level-Agreements (ELA) for workload placements, and ethical mapping/orchestration of workloads to infrastructure. Some embodiments may provide the ability to generate rules for the deployment and orchestration of assets, inclusive of workloads, and generates the ability to compare deployment decisions, inclusive of physical, logical, and algorithm assets, based on stated ethics context and tally scores. This capability may be used to establish the concept of ethics-level-agreements (ELAS) that can include such concepts as fairness, explainability, and data. By providing the ability for a provider company to set their context, such as an ethical context, and actions taken to meet the ethical context, embodiments may establish the intent to meet the ethical requirements of the workload placement and therefore establish a way for users to consume the assets based on the intended alignment to AI ethics considerations.

As another example, some embodiments may provide for utilization of infrastructure ethical capabilities for use in orchestration and expansion decisions. Particularly, through the establishment of the datastore and asset-level records of AI Ethics context, embodiments include a mechanism to query infrastructure components and receive a list of their contextualized ethical capabilities. This approach may enable both humans and automation to make infrastructure automation decisions that utilize ethical considerations in management and utilization decision making.

Finally, example embodiments may provide AI ethics decision making audit trails resulting in better human-in-the-loop prompting for ethical dilemmas. Particularly, embodiments may employ a historian that enables establishment of an audit trail for utilization based on AI ethics requirements. Embodiments may thus proactively notify a user/organization when an asset has been reevaluated and no longer meets the original intended tally or ethical requirements of that user/organization. For example, an asset may have been discovered, such as through a peer review or through the self-assessment of a provider, to not meet, or no longer meet, AI ethics standards as originally stated. The historian according to some example embodiments may review all decisions that used this asset in the past, and trigger notifications for risk assessment by a prospective user where the asset now falls outside of the minimum stated requirements.

D. Example Use Cases

Embodiments may be used, for example, in choosing a cloud provider based on the trustworthiness and ethics of overall assets for operational automation by an orchestration platform. For example, the Dell Technologies APEX platform may be peer reviewed and trusted inasmuch as it does not violate data AI ethics. Thus, a user may choose to use the APEX platform over a competing platform, based on the favorable treatment that APEX accords to user data rights, for example.

Further, embodiments may be used in choosing a multi-cloud recommendation service for deployment of highly sensitive workloads. In this example, order automation decisions may be based on the pillar values that align with the current workload type. For example, where no personal data rights are implicated, the 'Fairness' pillar may be prioritized over user data rights when choosing the AI automation assets to be placed by an orchestration process.

E. Example Methods

It is noted with respect to the example methods of FIG. 3 and elsewhere herein that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

F. Further Example Embodiments

Following are some further example embodiments of the invention. These are presented only by way of example and are not intended to limit the scope of the invention in any way.

Embodiment 1. A method, comprising: receiving an orchestration automation request for an asset; identifying an ethics rule that applies to the asset; comparing the ethics rule to asset values contained in an AI ethics datastore; based on the comparing, identifying a list of assets that conform to the ethics rule; and when the asset appears in the list of assets that conform to the ethics rule, automatically placing the asset at an entity of a computing infrastructure.

Embodiment 2. The method as recited in embodiment 1, wherein the asset comprises an algorithm.

Embodiment 3. The method as recited in any of embodiments 1-2, wherein the ethics rule relates to an AI ethics pillar, and the AI ethics pillar comprises one of: (1) accountability; (2) value alignment; (3) explainability; (4) fairness; and, (5) user data rights.

Embodiment 4. The method as recited in any of embodiments 1-3, wherein when the asset does not appear in the list of assets that conform to the ethics rules, the list of assets and the asset values are referred to a secondary decision making process.

Embodiment 5. The method as recited in embodiment 4, wherein the secondary decision making process is performed based in part on input concerning placement of the asset.

Embodiment 6. The method as recited in any of embodiments 1-5, wherein placing the asset at the entity comprises placing a computing workload at a particular computing system.

Embodiment 7. The method as recited in any of embodiments 1-6, wherein the ethics rule is defined and specified by an organization that orchestrates placement of the asset.

Embodiment 8. The method as recited in any of embodiments 1-7, wherein the AI ethics datastore maintains a list of assets of an organization with which the AI ethics datastore is associated.

Embodiment 9. The method as recited in any of embodiments 1-8, wherein the asset is associated with an asset context defined by a user.

Embodiment 10. The method as recited in any of embodiments 1-9, wherein the ethics rule comprises a specified AI ethics tally that indicates a minimum ethical standard to which the asset must conform.

Embodiment 11. A system for performing any of the operations, methods, or processes, or any portion of any of these, disclosed herein.

Embodiment N+2. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
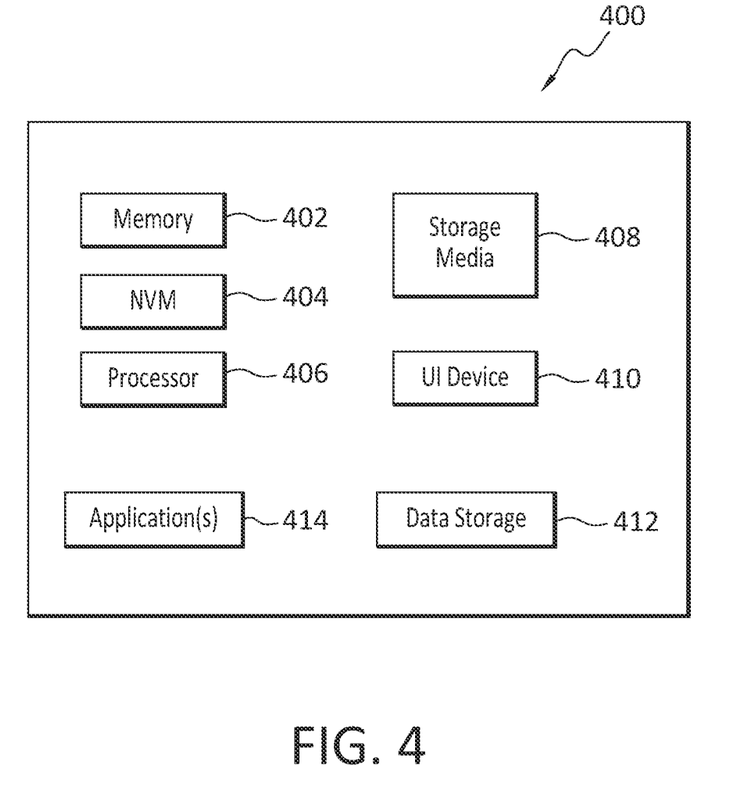
FIG. 4 discloses an example computing entity operable to perform any of the claimed methods, processes, and operations.

With reference briefly now to FIG. 4, any one or more of the entities disclosed, or implied, by FIGS. 1-3 and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

receiving an orchestration automation request for an asset;

identifying an ethics rule that applies to the asset;

comparing the ethics rule to asset values contained in an AI ethics datastore, wherein the ethics rule relates to AI ethics pillars, and the AI ethics pillars comprise (1) accountability, (2) value alignment, (3) explainability, (4) fairness, and (5) user data rights;

based on the comparing, identifying a list of assets that conform to the ethics rule;

using a historian, reviewing prior ethics-based decisions concerning placement and use of the asset;

in response to the reviewing of the prior ethics-based decisions, triggering a notification that a risk assessment concerning the asset should be performed by a prospective user of the asset prior to use of the asset by the prospective user;

based on the list of assets that conform to the ethics rule and the reviewing of the prior ethics-based decisions, automatically placing the assets at an entity of a computing infrastructure; and measuring a score for each of the AI ethics pillars by context of the asset, a machine, a creator of the asset, and a peer.

2. The method as recited in claim 1, wherein the triggering is performed when historical placement decisions involving the asset have been reevaluated and a determination made that the asset no longer conforms with the ethics rule.

3. The method as recited in claim 1, wherein when the asset does not appear in the list of assets that conform to the ethics rules, the list of assets and the asset values are referred to a secondary decision making process.

4. The method as recited in claim 3, wherein the secondary decision making process is performed based in part on input concerning placement of the asset.

5. The method as recited in claim 1, wherein placing the asset at the entity comprises placing a computing workload at a particular computing system.

6. The method as recited in claim 1, wherein the ethics rule is defined and specified by an organization that orchestrates placement of the asset.

7. The method as recited in claim 1, wherein the AI ethics datastore maintains a list of assets of an organization with which the AI ethics datastore is associated.

8. The method as recited in claim 1, wherein the asset is associated with an asset context defined by a user.

9. The method as recited in claim 1, wherein the ethics rule comprises a specified AI ethics tally that indicates a minimum ethical standard to which the asset must conform.

10. A non-transitory storage medium having stored therein instructions that are executable by one or more hardware processors to perform operations comprising:
receiving an orchestration automation request for an asset;
identifying an ethics rule that applies to the asset;
comparing the ethics rule to asset values contained in an AI ethics datastore, wherein the ethics rule relates to AI ethics pillars, and the AI ethics pillars comprise (1) accountability, (2) value alignment, (3) explainability, (4) fairness, and (5) user data rights;
based on the comparing, identifying a list of assets that conform to the ethics rule;
using a historian, reviewing prior ethics-based decisions concerning placement and use of the asset;
in response to the reviewing of the prior ethics-based decisions, triggering a notification that a risk assessment concerning the asset should be performed by a prospective user of the asset prior to use of the asset by the prospective user;
based on the list of assets that conform to the ethics rule and the reviewing of the prior ethics-based decisions, automatically placing the assets at an entity of a computing infrastructure; and
measuring a score for each of the AI ethics pillars by context of the asset, a machine, a creator of the asset, and a peer.

11. The non-transitory storage medium as recited in claim 10, wherein the triggering is performed when historical placement decisions involving the asset have been reevaluated and a determination made that the asset no longer conforms with the ethics rule.

12. The non-transitory storage medium as recited in claim 10, wherein when the asset does not appear in the list of assets that conform to the ethics rules, the list of assets and the asset values are referred to a secondary decision making process.

13. The non-transitory storage medium as recited in claim 12, wherein the secondary decision making process is performed based in part on input concerning placement of the asset.

14. The non-transitory storage medium as recited in claim 10, wherein placing the asset at the entity comprises placing a computing workload at a particular computing system.

15. The non-transitory storage medium as recited in claim 10, wherein the ethics rule is defined and specified by an organization that orchestrates placement of the asset.

16. The non-transitory storage medium as recited in claim 10, wherein the AI ethics datastore maintains a list of assets of an organization with which the AI ethics datastore is associated.

17. The non-transitory storage medium as recited in claim 10, wherein the asset is associated with an asset context defined by a user.

18. The non-transitory storage medium as recited in claim 10, wherein the ethics rule comprises a specified AI ethics tally that indicates a minimum ethical standard to which the asset must conform.

\* \* \* \* \*

UNITED STATES PATENT AND TRADEMARK OFFICE
CERTIFICATE OF CORRECTION

| | | |
|---|---|---|
| PATENT NO. | : 12,407,727 B2 | Page 1 of 1 |
| APPLICATION NO. | : 17/648410 | |
| DATED | : September 2, 2025 | |
| INVENTOR(S) | : Nicole Reineke et al. | |

It is certified that error appears in the above-identified patent and that said Letters Patent is hereby corrected as shown below:

In the Specification

Column 3
Line 48, change "106*a*, 106, and 106" to – 106*a*, 106*b*, and 106*c* –

Signed and Sealed this
Twenty-third Day of December, 2025

John A. Squires
*Director of the United States Patent and Trademark Office*